F. C. CANNON.
Carriage Lamp.

No. 9,328. Reissued Aug. 3, 1880.

Witnesses.
J. N. Chinnery.
Jos. C. Earle

Fred^k C. Cannon
Inventor
By Att'y.
Wm. D. Earle.

N. PETERS, PHOTO-LITHOGRAPHER, WASHINGTON, D. C.

UNITED STATES PATENT OFFICE.

FREDERICK C. CANNON, OF NEW HAVEN, CONNECTICUT.

CARRIAGE-LAMP.

SPECIFICATION forming part of Reissued Letters Patent No. 9,328, dated August 3, 1880.

Original No. 162,898, dated May 4, 1875. Application for reissue filed May 5, 1879.

*To all whom it may concern:*

Be it known that I, FREDERICK C. CANNON, of New Haven, in the county of New Haven and State of Connecticut, have invented a new Improvement in Carriage-Lamps; and I do hereby declare the following, when taken in connection with the accompanying drawings and the letters of reference marked thereon, to be a full, clear, and exact description of the same, and which said drawings constitute part of this specification, and represent, in—

Figure 1:
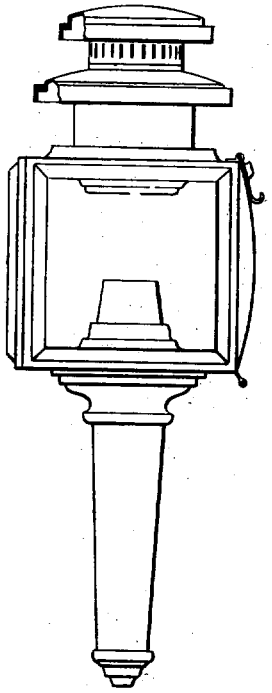
Figure 3:
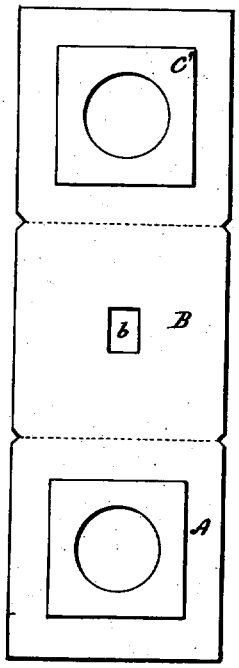
Figure 4:
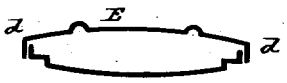
Figure 2:
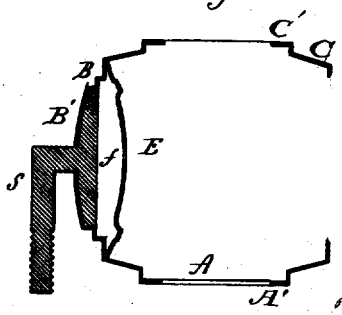

Figure 1, a side view and partial section; Fig. 2, a vertical section of the shell; Fig. 3, the blank bottom, back, and top; and in Fig. 4, a transverse section through the back or bottom.

This invention relates to an improvement in the manufacture of coach or carriage lamps.

Heretofore the bottom, top, and back have been formed in sections soldered together, and the lining has been set within and soldered inside the edge of the bottom or back. This construction necessitates many joints, which expose an unfinished appearance in addition to the complex construction.

The object of this invention is to simplify and reduce the cost of construction; and it consists in a coach-lamp body the back, bottom, and top of which are in one and the same piece, combined with a shank having its head upon the inside of the back, the stem projecting outward, and a lining to cover said head, as more fully hereinafter described.

The bottom A, back B, and top C are cut in a single piece from suitable sheet metal and by suitable dies. The depressions A′ B′ C′ from the inside are made to give the required external projection, as seen in Figs. 2 and 3. This piece is then bent at the angles to the form seen in Fig. 2. Heretofore these projections, which serve to strengthen the body as well as to form a base for the cap above and lamp below, have usually been made in separate pieces and soldered to the respective parts, which have also been made in separate or detached pieces.

In the back B a perforation, *b*, is made, through which the shank S is passed, as in Fig. 2, the head *f* of shank upon the inside resting in the cavity made by the depression B′, and where it is secured by solder. Over this the lining E is placed to hide the head. The lining E, which is placed to cover the back and bottom, is formed the size of these parts, with a flange, *d*, to extend over the edge of the back or bottom. This lining is set in place, as in Fig. 4, and the flange *d* is soldered to the back or bottom, outside or between the flange *d* and the edge of the back or bottom, as the case may be. This hides from view the means of securing the parts together, and gives to the interior or lining a much more finished appearance than the usual internal soldering.

I claim as my invention—

1. A coach-lamp body, the back, bottom, and top of which are in one and the same piece, combined with a shank, S, having its head *f* upon the inside of the back, the stem projecting outward, and a lining to cover said head, substantially as described.

2. In a coach-lamp made from sheet metal, the bottom and top constructed, respectively, with a depression, A′ C′, struck in the metal from the inside outward to form a corresponding projection on the outside as a base for the cap above or lamp below, substantially as described.

3. In a coach-lamp, the back constructed with a depression from the inside outward, and a perforation, *b*, through said depression, combined with a shank, S, extending through the perforation *b*, its head resting in said depression, substantially as described.

4. In a coach-lamp made from sheet metal, the bottom constructed with the depression A′, struck in the metal from inside outward, to form a corresponding projection on the outside as a base for the lamp, substantially as described.

FREDERICK C. CANNON.

Witnesses:
JOHN E. EARLE,
JOS. C. EARLE.